July 26, 1938.  R. P. LANSING  2,125,187
PROPELLER
Filed June 21, 1937
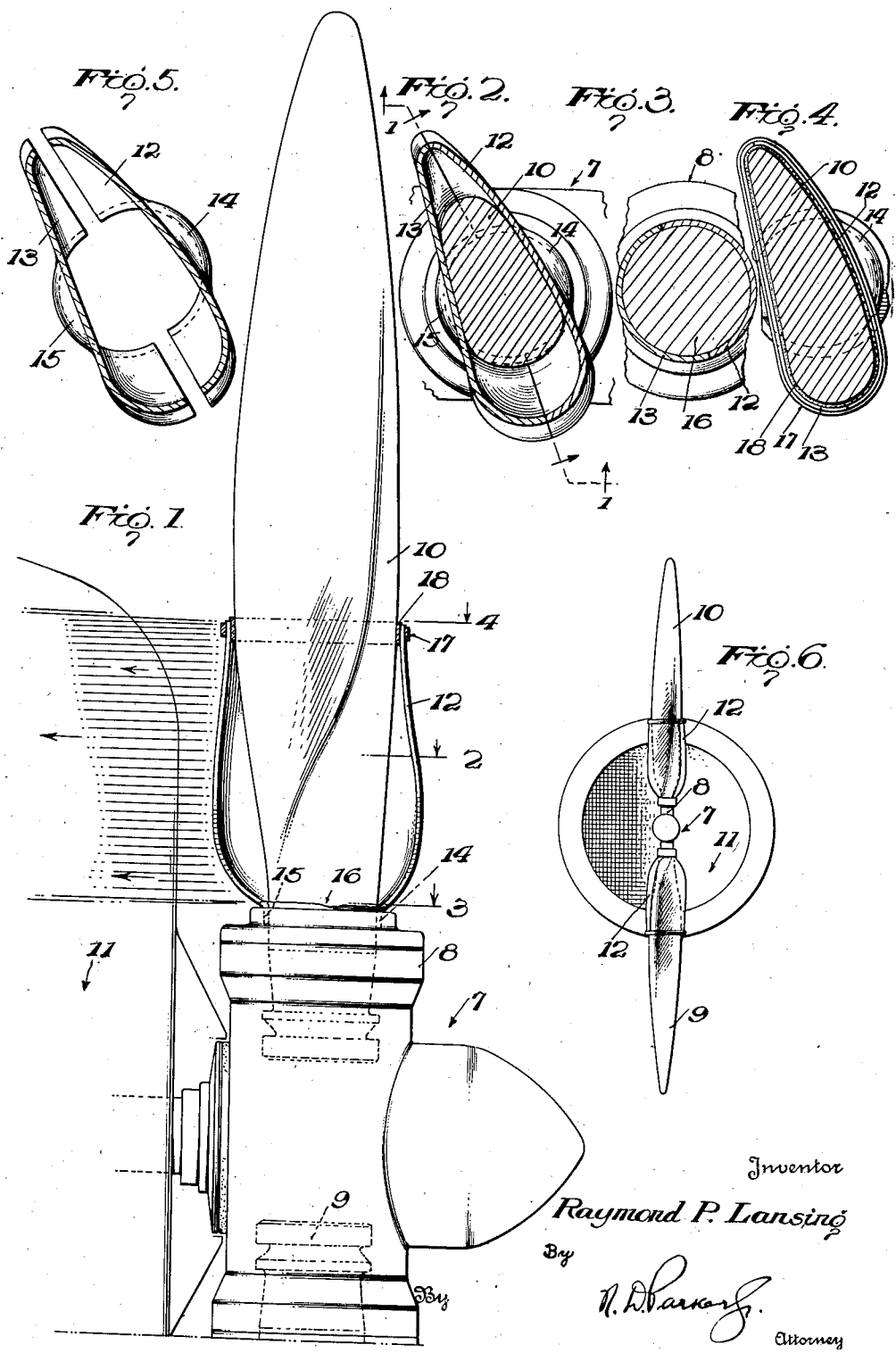
Inventor
Raymond P. Lansing
By
N. D. Parker
Attorney Patented July 26, 1938

2,125,187

UNITED STATES PATENT OFFICE 2,125,187

PROPELLER

Raymond P. Lansing, Montclair, N. J., assignor to Eclipse Aviation Corporation, East Orange, N. J., a corporation of New Jersey Application June 21, 1937, Serial No. 149,488

7 Claims. (Cl. 170—159)

This invention relates to aircraft propellers and more particularly to an attachment for a propeller whereby the latter, during operation, serves to force an adequate supply of cooling air over the driving engine.

In aircraft propellers now in use, the airfoil section of the blades gradually merges into a substantially cylindrical section adjacent the inner ends, the latter being formed in this manner for securing strength and to facilitate the mounting of the blades. With the inner ends of the blades so constructed, the propeller effects very little fanning action adjacent its central portion. Since the engine driving the propeller is usually positioned within the area defined by the substantially cylindrical inner blade portions, in order to provide for efficient cooling, it has heretofore been necessary to utilize complicated systems of cowling and air ducts.

It is accordingly one of the objects of the present invention to provide a propeller construction which shall be so constituted as to create, during operation, a sufficient draft of air to efficiently cool the engine.

Another object is to provide, in an aircraft propeller, an attachment for the inner ends of the blades which will function during operation of the propeller to direct a draft of cooling air over the engine.

Still another object is to provide a readily detachable fairing for the inner ends of propeller blades, which fairing, when secured to the blades, will connect the cylindrical end portions thereof into airfoil sections, thus enabling a fanning effect to be secured by the propeller during operation, without adding any appreciable weight to the latter.

A further object is to provide a device of the above character which will be light in weight and which may be readily and quickly secured to a propeller blade for the purpose of securing efficient engine cooling.

Other objects and novel features of the invention will appear more fully hereinafter from the following detailed description when taken in connection with the accompanying drawing, wherein one embodiment of the invention is illustrated. It is to be expressly understood, however, that the drawing is employed for purposes of illustration only and is not to be taken as a definition of the limits of the invention, reference being had for this purpose to the appended claims.

Referring to the drawing, wherein similar reference characters refer to similar parts throughout the several views:

Fig. 1 is a side view of a propeller constructed in accordance with the present invention;

Figs. 2, 3 and 4 are transverse sectional views of a propeller blade of Fig. 1 taken along lines 2—2, 3—3 and 4—4 respectively;

Fig. 5 is a sectional view of the propeller fairing of Fig. 1, and

Fig. 6 is a front view of the propeller of Fig. 1.

The present invention is illustrated in Fig. 1 as being associated with a propeller 7 having a hub 8 of conventional design and adapted to receive a plurality of propeller blades 9 and 10. The propeller is adapted to be driven by a suitable engine 11 in a well-known manner.

One of the important problems in aircraft propeller installations has been the provision of adequate cooling means for the engine driving the propeller. Generally, the engine is so positioned as to extend approximately one-third of the blade length upon either side of the center of the propeller and this portion of the blade length does not have an appreciable pitch in order to effect a flow of cooling air over the engine. As will be perceived from the sectional views illustrated in Figs. 2 and 4, the pitch of the blade 10 gradually diminishes from that portion of the blade indicated by the lines 4—4 to the inner end thereof. Substantially little fanning action is thus produced by this portion of the blade.

In order to increase the draft of cooling air over the engine 11, the present invention provides a fairing which is adapted to be removably secured to the inner ends of each blade within the area where a cooling draft of air is desired. As shown, such fairing is constituted by a pair of complementary sections 12 and 13, comprised of any suitable light-weight material such as balsa wood or thin sheet metal, and provided with cylindrical portions 14 and 15 adapted to closely embrace the cylindrical portion 16 of the propeller blade and to be received within hub 8. The fairing extends outwardly substantially one-third of the blade length and the two portions 12 and 13 are clamped about the blade by means of any suitable clamping ring such as 17, a resilient washer 18 being preferably interposed between the upper ends of the fairing sections and the exterior of the blade.

In order to produce the most efficient fanning action, the fairing is of airfoil section, such section being of substantially the same extent and pitch as the section and pitch of the blade at the section line 4—4. The pitch of the fairing is unchanged throughout its length and is gradually merged into the cylindrical portions 14 and 15.

It will be readily perceived from the above that the application of the fairing construction to the propeller blades so alters the contour of the inner ends of said blades as to effect an efficient fanning action during operation of the propeller. The arrangement does not affect the efficiency of the propeller as regards its performance in propelling the aircraft and may be readily applied and dismantled in a short time and with a minimum amount of effort.

While one embodiment of the invention has been shown and described herein, it will be understood by those skilled in the art that the invention is not limited thereto but may be embodied in various forms. Reference will, therefore, be had to the appended claims for a definition of the limits of the invention.

What is claimed is:

1. In combination with an aircraft propeller blade having a substantially cylindrical inner end, a removable fairing of airfoil section surrounding and attached to said end.

2. A fairing attachment for a propeller blade of the type having a substantially cylindrical inner end, said attachment being of airfoil section and adapted to be removably secured to said end.

3. In an aircraft propeller blade having an airfoil section, the inner end of said blade being substantially cylindrical for approximately one-third of the blade length, a fairing of airfoil section removably secured to the substantially cylindrical inner end.

4. In an aircraft propeller having a plurality of blades, each blade being of airfoil section throughout the major portion of its length and having substantially cylindrical inner end portions, and means for creating a forced draft of air during rotation of the propeller comprising a fairing of airfoil section removably secured to the inner ends of each blade and extending outwardly approximately one-third of the length of the blades.

5. In an aircraft propeller having a blade of airfoil section, the inner end portion of said blade being substantially cylindrical, a fairing for said inner end removably secured thereto, said fairing being of airfoil section throughout substantially its entire length and merging into the contour of the blade at substantially one-third of the length of the latter.

6. In an aircraft propeller having a blade of airfoil section, the inner end portion of said blade being substantially cylindrical, a fairing of airfoil section removably positioned about said inner end portion, said fairing being of substantially the same pitch throughout its length and surrounding the inner end of said blade for a distance approximating one-third of the length of the blade.

7. In an aircraft propeller having a blade of airfoil section throughout the major portion of its length, the inner end portion of the blade being substantially cylindrical, and a fairing for creating a substantial draft of air during operation of the propeller, said fairing being formed of a pair of complementary parts removably positioned about said inner end portion and extending outwardly along the blade for a distance approximating one-third of the length of the latter, said fairing being of airfoil section and having substantially the same pitch throughout its length.

RAYMOND P. LANSING.